Jan. 24, 1956  H. M. BROWN  2,732,188
COMBINED PIE CRUST CUTTER AND WATER DISPENSER
Filed Aug. 2, 1954
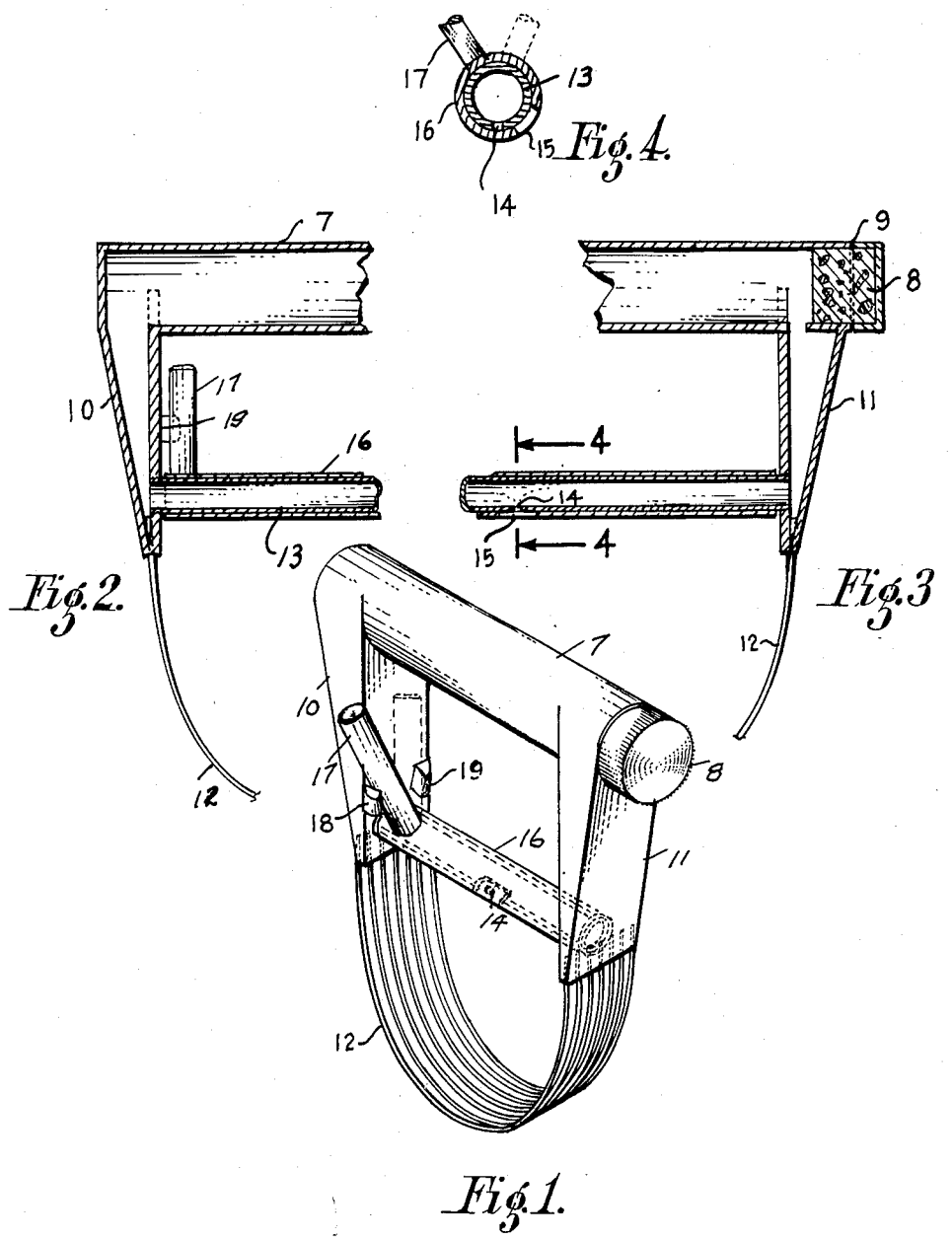
INVENTOR
Harold M. Brown

United States Patent Office 2,732,188
Patented Jan. 24, 1956

2,732,188

COMBINED PIE CRUST CUTTER AND WATER DISPENSER

Harold M. Brown, Redwood City, Calif.

Application August 2, 1954, Serial No. 447,206

1 Claim. (Cl. 259—144)

This invention relates to improvements in culinary devices and has particular reference to a combined cutter and water dispenser for preparing pie crust.

In my co-pending application Serial Number 332,837 filed January 23, 1953, that has now matured into Patent 2,697,590 of the date of December 21, 1954, that relates to a combined cutter and water dispenser for preparing pie crust, the liquid was fed to the cutter elements through apertures in the side arms of the device, which arms supported on their upper ends a tubular water holding handle and carried on their lower ends the cutting wires of the invention. To accordingly control and regulate the flow of water to the wires to thus prevent an excess supply of water for the flour and shortening, being mixed and cut, I have devised the improvements set forth in the present application.

The principal object of the present invention is to utilize the tubular handle of the device as a source of water supply, and to employ manually actuated means for controlling and regulating the flow of water from the source of water supply to the cutter elements of the device, namely the utilization of a valve control medium, whereby a most satisfactory mixing of the water with the flour and the shortening is accomplished, thus producing a very palatable pie crust wherein sogginess is effectively eliminated.

A further object of the invention is to employ a stop means associated with the side arms of the device, whereby the length of travel, of the operating handle controlling the water flow, is governed.

A further object of the invention is the production of an appliance of the character described and means for operating the same, that are simple in construction, economical to manufacture, positive in operation, and highly efficient and serviceable in use.

Other objects and advantages will be apparent during the course of the following description.

In the accompanying drawings forming a part of this specification and in which like numerals are employed to designate like parts throughout the same, Fig. 1 is a perspective view of the device constructed in accordance with my invention, Fig. 2 is a fragmentary vertical sectional view through a portion of the device and disclosing to advantage the valve operating handle, Fig. 3 is a fragmentary vertical sectional view illustrating the closure means for the water holding handle and the relationship of the water conveying tube and the rotatable sleeve mounted thereon, Fig. 4 is a sectional view disclosing to advantage the aperture and opening in the respective tube and sleeve, the view being taken on the line 4—4 of Fig. 3 and looking in the direction of the arrows.

In preparing pie crust for the making of pies it is the customary procedure to mix shortening with flour and then add a supply of water, while resorting to a cutting action or a mixing action of the flour and shortening. Frequently the added water is deposited in one spot, or is in excess of the amount necessary, and there results an undesirable sogginess in the prepared pie crust. To overcome this difficulty I have embodied in the present implement a definite means for controlling and regulating the flow of water.

In the accompanying drawing wherein for the purpose of illustration is shown a preferred embodiment of the invention, the numeral 7 designates a tubular handle equipped with a closure member 8, such as a cork that seals a single end opening 9 in the handle after the handle has been filled with a supply of water. The handle is provided at each end with downwardly extending hollow tapered arms 10 and 11, each arm being in communication with the handle and adapted to convey a supply of water therefrom.

Connected to the respective sealed lower ends of said arms are a plurality of spaced substantially semi-circular cutting wires 12 that serve as a medium for cutting and mixing the flour, shortening and water that comprise the uncooked ingredients of pie crust, prior to baking the pie.

As disclosed to advantage in the figures of the drawings, the numeral 13 designates a substantially horizontal tube that is interposed between the side arms and is equipped at its ends with respective right and left hand threads for threadedly engaging the inner portions of the arms 10 and 11. It will be noted that said tube communicates with the hollow arms for receiving a supply of water therefrom, after the water has passed from the tubular handle to said arms. The said tube is provided with a central opening or port 14 that is adapted to register, when the water is flowing, with a substantially rectangular aperture 15 provided in a sleeve 16 that encompasses the said tube, the sleeve capable of being partially rotated on said tube. The means for actuating said sleeve comprises a short handle 17 that is manipulated by a finger or thumb of the user when it is desired to regulate and control the flow of water.

Suitably spaced stops 18 and 19 are carried by the arm 10, which stops serve to limit the degree of rotation of the handle and the sleeve. In the operation of the implement a supply of water is first sealed in the handle 7. The water will then pass to the arms 10 and 11 and thence to the tube 13. Prior to the flow of the water the handle 17 is manipulated to assume the position of the same as illustrated in Fig. 1 and the openings 14 and 15 will be out of register. By manipulating the handle rearwardly, until it contacts the stop 19, the opening and the aperture will be placed in registration and a limited amount of water will flow to the cutting surface of the wires. There will thus result a thorough commingling of the water and the ingredients and danger of sogginess of the pie crust will be eliminated due to the novel and practical control means herein employed.

It is to be understood that the form of my invention herewith shown and described is to be taken as a preferred example of the same and that various changes relative to the shape, size, material and arrangement of parts may be readily resorted to without departing from the spirit of the invention or the scope of the subjoined claim.

I claim:

A device of the character described comprising a tubular handle for holding a supply of water therein, a pair of hollow side arms depending from said handle and in communication therewith for receiving water from said handle, an apertured tubular member interposed between and connected to said arms for receiving the flow of water therefrom, an apertured sleeve encompassing said tubular member and capable of rotary movement thereon, the apertures in the tubular member and sleeve being arranged to be brought in and out of registry by rotation of the sleeve, a manually actuated operating handle secured to said sleeve for rotating the latter, and a plurality of spaced curved cutting wires fixed at their upper ends to the lower extremities of said arms, the wires capable of receiving thereon the water passing through and dripping from said tubular member.

References Cited in the file of this patent

UNITED STATES PATENTS 2,697,590    Brown  ---------------- Dec. 21, 1954